US012002381B2

(12) United States Patent
Newman et al.

(10) Patent No.: US 12,002,381 B2
(45) **Date of Patent: *Jun. 4, 2024**

(54) PROTECTIVE DISPLAY CASE

(71) Applicant: M1NT, INC., Wilmington, DE (US)

(72) Inventors: Collin M. Newman, Los Angeles, CA (US); Brian P. Bybee, Los Angeles, CA (US); Shannon J. Soong, Fayetteville, GA (US); Samuel J. Norcutt, Lantzville (CA); Jonathan E. Thai, San Jose, CA (US); Michael S. Yim, San Jose, CA (US)

(73) Assignee: M1NT, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,153

(22) Filed: Apr. 5, 2023

(65) Prior Publication Data

US 2023/0282136 A1 Sep. 7, 2023

Related U.S. Application Data

(63) Continuation of application No. 17/897,605, filed on Aug. 29, 2022, now Pat. No. 11,688,304.

(60) Provisional application No. 63/238,032, filed on Aug. 27, 2021.

(51) Int. Cl.
*G09F 1/12* (2006.01)

(52) U.S. Cl.
CPC .................................... *G09F 1/12* (2013.01)

(58) Field of Classification Search
CPC ........................................................ G09F 1/12
See application file for complete search history.

(56) References Cited

U.S. PATENT DOCUMENTS

| | | | | |
|---|---|---|---|---|
| 4,979,619 | A | 12/1990 | Hager | |
| 5,588,240 | A * | 12/1996 | Zilliox | G09F 1/12 40/605 |
| 5,836,585 | A * | 11/1998 | LaCivita | A63F 3/00895 273/287 |
| 5,979,097 | A * | 11/1999 | Moore | G09F 1/12 40/717 |
| 6,308,831 | B1 * | 10/2001 | Saxe | G09F 1/12 206/39 |
| 6,673,191 | B2 | 1/2004 | Harwell et al. | |
| 11,403,970 | B2 | 8/2022 | McEnery | |
| 2002/0069567 | A1 | 6/2002 | Marino | |
| 2003/0014892 | A1 | 1/2003 | Matsuda | |

(Continued)

*Primary Examiner* — Gary C Hoge
(74) *Attorney, Agent, or Firm* — Jacob M. Ward; Ward Law Office LLC

(57) ABSTRACT

A protective display case configured to encase memorabilia is provided. The protective display case includes a front chassis assembly having a front chassis and a front chassis glazing member. A gasket is seated in a groove formed in the front chassis. A spacer is seated over the front chassis glazing member. Memorabilia is positioned within a cutout formed in the spacer. A rear chassis assembly has a rear chassis and a rear chassis glazing member. The rear chassis assembly is attached to the front chassis assembly with the gasket, spacer and memorabilia positioned therebetween. A bezel is configured to cover perimeters of the front and rear chassis assemblies, gasket, spacer and memorabilia. Front and rear layers of protective glass are secured to the front and rear chassis assemblies.

20 Claims, 8 Drawing Sheets

(56) References Cited

U.S. PATENT DOCUMENTS

| | | | | |
|---|---|---|---|---|
| 2003/0146124 | A1 * | 8/2003 | Augustine | G09F 1/12 206/455 |
| 2003/0196362 | A1 * | 10/2003 | Harwell | G09F 1/12 40/781 |
| 2004/0007870 | A1 | 1/2004 | Ueno | |
| 2021/0188197 | A1 | 6/2021 | Gaitan | |

* cited by examiner

PROTECTIVE DISPLAY CASE

This application claims the benefit of pending U.S. Utility patent application Ser. No. 17/897,605 filed on Aug. 29, 2022, which claimed priority to U.S. Provisional Patent Application No. 63/238,032, filed Aug. 27, 2021. The entire disclosures of the above applications are incorporated herein by reference.

FIELD

The present disclosure relates generally to protective display cases and, more particularly, to a protective display case for a piece of art or a collectible, such as a baseball card, wherein the protective display case prevents damage to the piece, deters counterfeiting, and enhances visual presentation.

INTRODUCTION

This section provides background information related to the present disclosure which is not necessarily prior art.

Current options for protecting and long-term preservation of trading cards, memorabilia, and other similar artwork do not meet accepted institutional archival standards for the storage of such items, and they suffer from low aesthetic appeal. More specifically, conventional devices use materials that do not meet current archival standards and could potentially harm or degrade the enclosed artwork during long-term storage. For example, plastics and acrylics are regularly used for the conventional devices, but these materials are known to chemically alter, degrade, and otherwise damage the artwork. As a result, some institutions that curate and protect collections of cards and other memorabilia regularly remove artwork from such plastic cases currently on the market before displaying them in their collections because of the danger those cases pose to the artwork.

Furthermore, the existing devices that use simple plastic materials and mechanical sealing methods also do not pose a substantial deterrent to motivated counterfeiters and other criminals intent on fraud.

Therefore, it would be advantageous to display trading cards, memorabilia, and other similar artwork, in a display case that securely stores the memorabilia without damaging it and while simultaneously reducing the chances of counterfeiting or theft.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the protective display case.

In concordance with the instant disclosure, the above objects as well as other objects not specifically enumerated are achieved by a protective display case configured to encase memorabilia. The protective display case includes a front chassis assembly having a front chassis and a front chassis glazing member. A gasket is seated in a groove formed in a front face of the front chassis. A spacer is seated over the front chassis glazing member. Memorabilia is positioned within a cutout formed in the spacer. A rear chassis assembly has a rear chassis and a rear chassis glazing member. The rear chassis assembly is attached to the front chassis assembly with the gasket, spacer and memorabilia positioned therebetween. A bezel is configured to cover perimeters of the front and rear chassis assemblies, gasket, spacer and memorabilia. A front layer of protective glass secured to the front chassis assembly and a rear layer of protective glass secured to the rear chassis assembly.

The above objects as well as other objects not specifically enumerated are also achieved by a method of assembling a protective display case. The method includes the steps of forming a front chassis assembly having a front chassis and a front chassis glazing member, seating a gasket in a groove formed in a front face of the front chassis, seating a spacer over the front chassis glazing member, seating memorabilia into a cutout formed in the spacer, forming a rear chassis assembly having a rear chassis and a rear chassis glazing member, attaching the front and rear chassis assemblies together with the gasket, spacer and memorabilia positioned therebetween, arranging the front and rear chassis assemblies, gasket, spacer and memorabilia within a bezel, securing the bezel to the front chassis assembly, securing a front layer of protective glass to the front chassis assembly and securing a rear layer of protective glass to the rear chassis assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
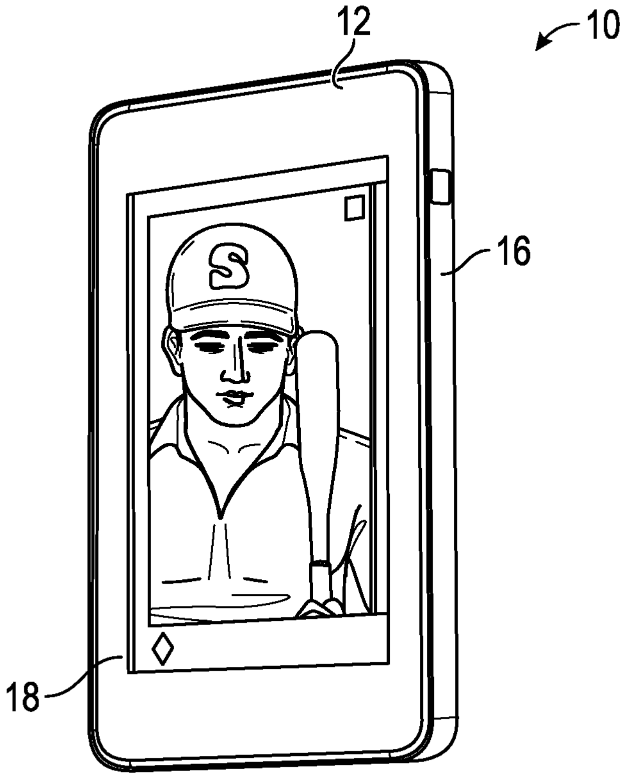
FIG. 1 is a perspective front view of a novel, protective display case in accordance with the invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. “A” and “an” as used herein indicate “at least one” of the item is present; a plurality of such items may be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by “about” and/or “substantially” is not otherwise understood in the art with this ordinary meaning, then “about” and/or “substantially” as used herein indicates at least variations that may arise from ordinary methods of measuring or using such parameters.

Although the open-ended term “comprising,” as a synonym of non-restrictive terms such as including, containing, or having, is used herein to describe and claim embodiments of the present technology, embodiments may alternatively be described using more limiting terms such as “consisting of” or “consisting essentially of.” Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of “from A to B” or “from about A to about B” is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8,1-3,1-2,2-10, 2-8,2-3,3-10,3-9, and so on.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

In accordance with the illustrated embodiments of the present disclosure, a novel protective display case is provided. Generally, the novel protective display case securely stores trading cards, memorabilia, and other similar artwork without damaging the protected material and while simultaneously reducing the chances of counterfeiting or theft of the protected material.

Figure 2:
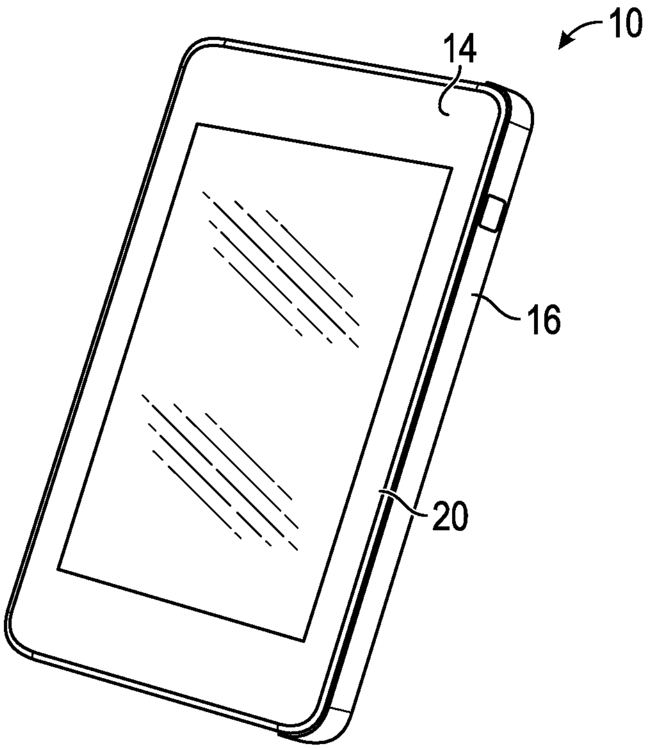
FIG. 2 is a rear perspective view of the novel, protective display case of FIG. 1.
Figure 3:
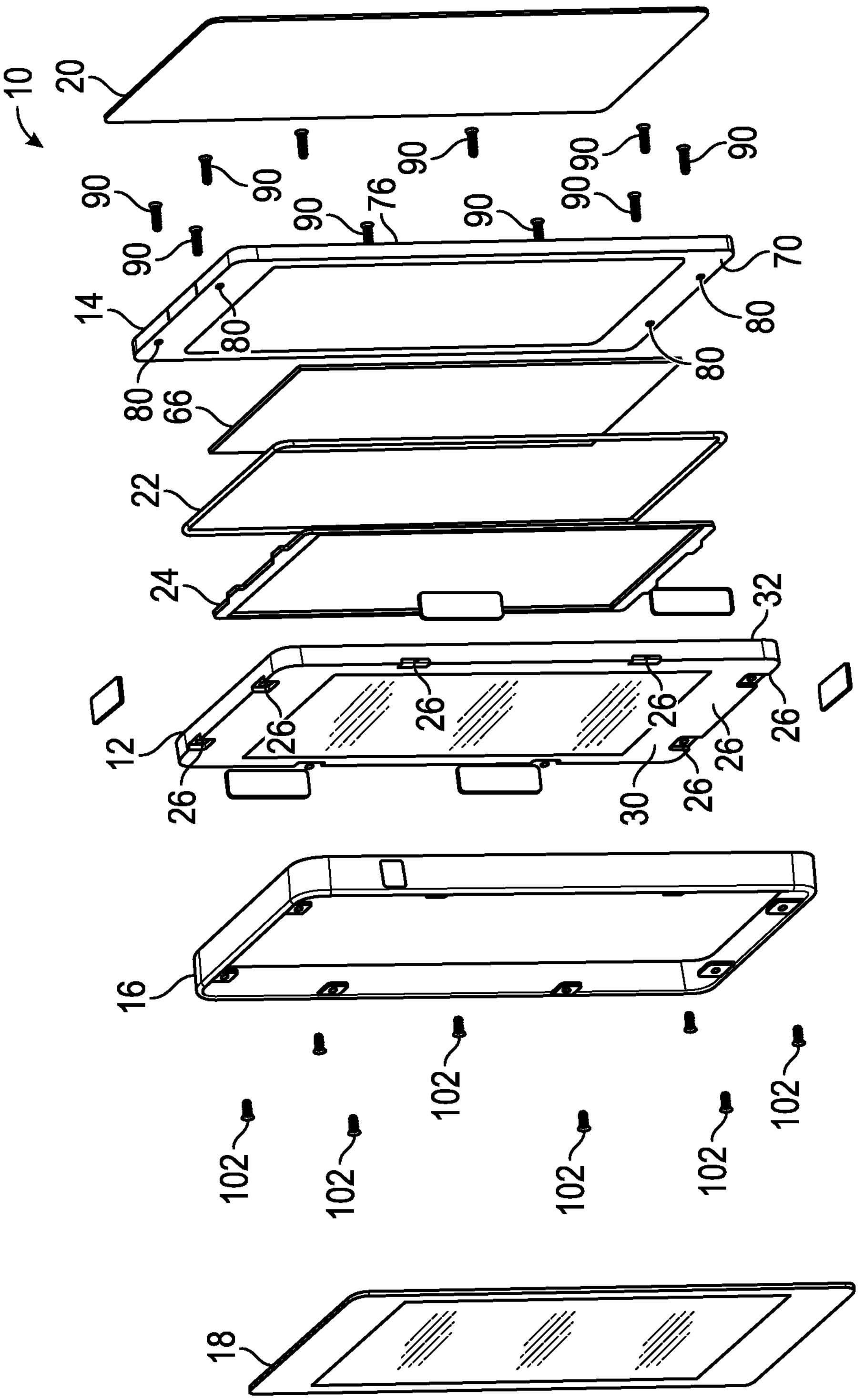
FIG. 3 is an exploded perspective view of the novel, protective display case of FIG. 1.

Referring now to the drawings, a first embodiment of a novel protective display case (hereafter “display case”) is illustrated generally in FIGS. 1-3 at 10. The display case 10 is configured to encase memorabilia in a protective case that facilitates display of both front and rear sides of the memorabilia while protecting the memorabilia from damage, counterfeiting and theft. The display case includes a front chassis assembly 12, a rear chassis assembly 14, a circumferential bezel 16, a front layer of protective glass 18, a rear layer of protective glass 20, a gasket 22 and a spacer 24.

Figure 4:
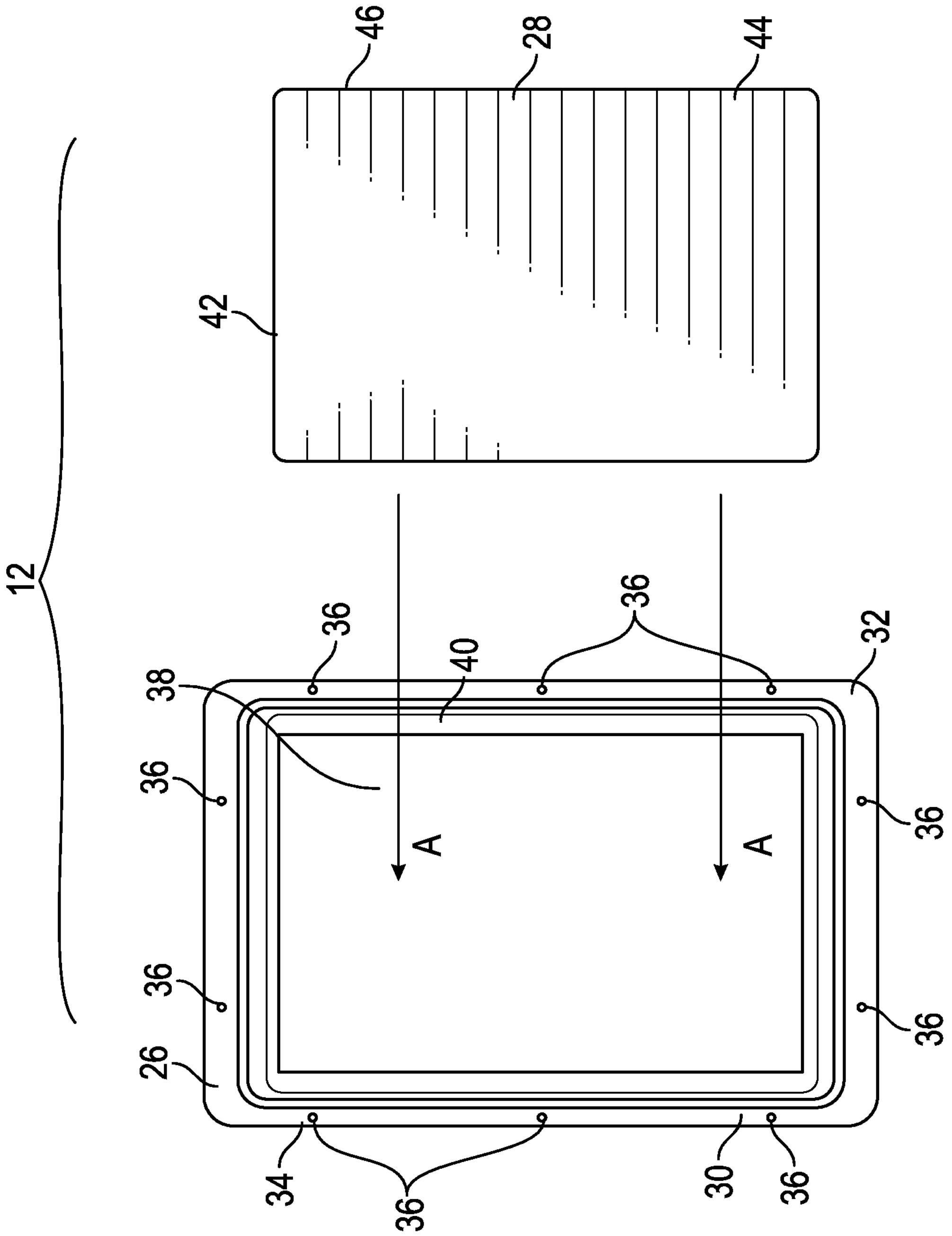
FIG. 4 is a front view of a front chassis and front layer glazing member of the novel, protective display case of FIG. 1.

Referring now to FIG. 4, the front chassis assembly 12 includes a front chassis 26 and a front chassis glazing member 28. The front chassis 26 includes an exterior face 30, an opposing interior face 32 and a perimeter 34. A plurality of spaced-apart apertures threaded 36 extend from the exterior face 30 to the interior face 32. Similarly, a cutout 38 extends from the exterior face 30 to the interior face 32 and is bounded by a shoulder 40 formed in the interior face 32. The cutout 38 is configured to facilitate visibility of the encased memorabilia. In the illustrated embodiment, the cutout 38 and the shoulder 40 have a rectangular cross-sectional shape that approximates the rectangular cross-sectional shape of the front chassis glazing member 28. In alternate embodiments, the cutout 38 and the shoulder 40 can have other cross-sectional shapes, sufficient to facilitate visibility of the encased memorabilia.

In the illustrated embodiment, the front chassis 26 is formed from a metallic material, such as the non-limiting example of 416 or 416HT stainless steel and includes one or more physical protective and/or decorative coatings. One example of a suitable coating is Physical Vapor Deposition (PVD). Without being held to the theory, it is believed the use of 416 or 416HT stainless steel provides exceptional corrosion resistance, high strength in addition to magnetic properties. It should be appreciated that in other embodiments, other metallic materials can be used sufficient to provide exceptional corrosion resistance and high strength. The use of a PVD process provides a coating that is extremely durable and more resistant to corrosion from sweat and regular wear than gold plating. However, it should be appreciated that in other embodiments, other suitable plating processes can be used.

Referring again to FIG. 4, the front chassis glazing member 28 includes an exterior face 42, an interior face 44 and an outer perimeter 46. The front chassis glazing member 28 has a cross-sectional shape that approximates the cross-sectional shape of the cutout 38. In an initial assembly step, the front chassis glazing member 28 is seated within the cutout 38 and against the shoulder 40, with the outer perimeter 46 abutting the front chassis 26, as schematically depicted by direction arrows A. The front chassis glazing member 28 is bonded to the shoulder 40 of the front chassis 26 in the installed position.

Referring again to FIG. 4, the front chassis glazing member 28 is formed from an acrylic-based material, such as the non-limiting example of Optium Museum Glass, manufactured and marketed by Tru Vue, Inc., headquartered in McCook, Illinois Without being held to the theory, it is believed the use of an acrylic-based material, such as for example, Optium Muesum Glass provides many benefits, including the non-limiting examples of UV protection, abrasion resistance, anti-reflective qualities, anti-static qualities and shatter resistance. It should be appreciated that in other embodiments, other suitable materials can be used sufficient to provide the functions described herein.

Figure 5:
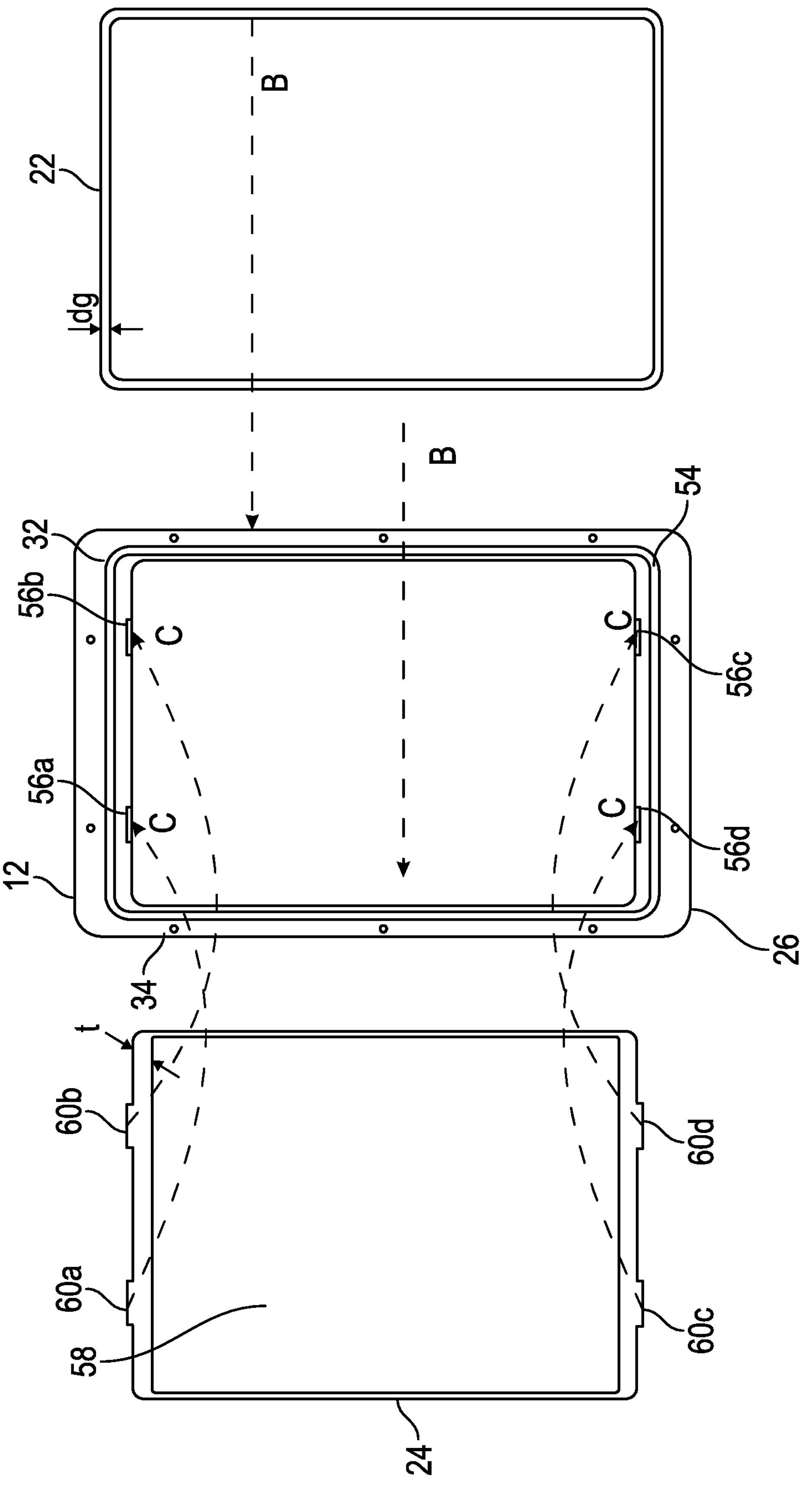
FIG. 5 is a front view of a front chassis assembly of the novel, protective display case of FIG. 1 illustrated with a gasket and spacer of the novel, protective display case of FIG. 1.

Referring now to FIG. 5, the interior face 32 of the front chassis 26 includes a groove 54 and a plurality of spaced apart recesses 56*a*-56*d*. The groove 54 bounds the cutout 38 and is configured to receive a portion of the gasket 22. In the illustrated embodiment, the groove has a rectangular cross-sectional shape that approximates the cross-sectional shapes of the front chassis glazing member 28 and the cutout 38. However, it should be appreciated that in other embodiments, the groove 54 can have other cross-sectional shapes, including the non-limiting example of a square cross-sectional shape, sufficient to bound the cutout 38 and to receive a portion of the gasket 22.

Referring now to FIG. 5, the gasket 22 has a rectangular cross-sectional shape that approximates the cross-sectional shapes of the groove 54. In an installed orientation the gasket 22 is configured to form a seal between the front and rear chassis assemblies 12, 14. The gasket 22 has a diameter dg. The diameter dg is larger than the depth of the groove 54, such that in an installed orientation a portion of the gasket extends in an outward direction from the interior face 32 of the front chassis 26 in a manner such as to engage the rear chassis assembly 14.

Referring again to the embodiment shown in FIGS. 3 and 5, the gasket 22 has the form of an O-ring and is formed from a chemically resistant, fluoroelastomer material. One non-limiting example of a suitable gasket is an O-ring formed of Viton®, having a diameter of 1.6 mm, a Durometer value of 75A, meeting ASTM Specification D2000 and marketed by McMaster-Carr as part number 94245K51. However, it should be appreciated that in other embodiments, other suitable materials can be used to form the gasket 22, sufficient to form a seal between the front and rear chassis assemblies 12, 14. Referring now to FIG. 5, in a next assembly step, the gasket 22 is seated in the groove 54, as schematically depicted by direction arrows B. As described above, a portion of the gasket 22 extends in an outward direction from the interior face 32 of the front chassis 26 in a manner such as to engage the rear chassis assembly 14.

Referring now to FIG. 5, the spaced apart recesses 56*a*-56*d* extend from the shoulder 40 and are configured to receive portions of the spacer 24. In the illustrated embodiment, each of the spaced apart recesses 56*a*-56*d* has a rectangular cross-sectional shape that approximates a cross-sectional shape of the received portions of the spacer 24. However, it should be appreciated that in other embodiments, each of the spaced apart recesses 56*a*-56*d* can have other cross-sectional shapes, including the non-limiting example of a square cross-sectional shape, sufficient to received portions of the spacer 24. Further, it is contemplated that other embodiments may exclude the spaced apart recess mating features 56*a*-56*d*, 60*a*-60*d* currently located in the front chassis assembly 12 and the spacer 24.

Referring again to FIG. 5, the spacer 24 is configured to receive memorabilia (not shown) and is further configured to center the memorabilia within the cutout 38 of the front chassis 26. The spacer 24 includes a spacer cutout 58 and a plurality of spaced apart tabs 60*a*-60*d*. The spacer cutout 58 is configured to facilitate visibility of the encased memorabilia and has a size and shape that approximates the encased memorabilia.

Referring again to FIG. 5, the spacer 24 has a thickness t. The thickness t approximates a thickness of the memorabilia, such that the memorabilia will seat in a flat orientation when installed between the front and rear chassis assemblies 12, 14.

Referring again to FIG. 5, each of the plurality of spaced apart tabs 60*a*-60*d* have a rectangular shape that approximates the rectangular shape of the corresponding recesses 56*a*, 56*b*. In an installed arrangement, the spaced apart tabs 60*a*-60*d* are configured to engage the spaced apart recesses 56*a*-56*d*, thereby preventing movement of the encased memorabilia. In other embodiments, it should be appreciated that the spaced apart recesses 56*a*-56*d* and the spaced apart tabs 60*a*-60*d* can have other shapes and sizes, or can be completely excluded, sufficient to prevent movement of the encased memorabilia.

Referring again to the embodiment shown in FIG. 5, the spaced apart recesses 56*a*-56*d* of the front chassis 26 and the spaced tabs 60*a*-60*d* of the spacer 24 are limited to two (2) sides of the front chassis 26 and the spacer 24. In other embodiments, the spaced apart recesses 56*a*-56*d* of the front chassis 26 and the spaced tabs 60*a*-60*d* of the spacer 24 can be positioned on any desired number of sides of the front chassis 26 and the spacer 24, sufficient to prevent movement of the encased memorabilia.

Referring again to the embodiment shown in FIGS. 3 and 5, the spacer 24 can b formed from various materials, including the non-limiting examples of card stock material and chemically inert polymeric materials. The term "card stock material", as used herein, is defined to mean any product, paper or otherwise, that is thicker and more durable than normal writing materials, but thinner and more flexible than other forms of paperboard. One non-limiting example of a chemically inert polymeric material is Mylar®. Referring now to FIG. 5, in a next assembly step, the tabs 56*a*-56*d* of the spacer 24 are seated in the recesses 56*a*-56*d* of the front chassis 26, as schematically depicted by direction arrows C.

Figure 6:
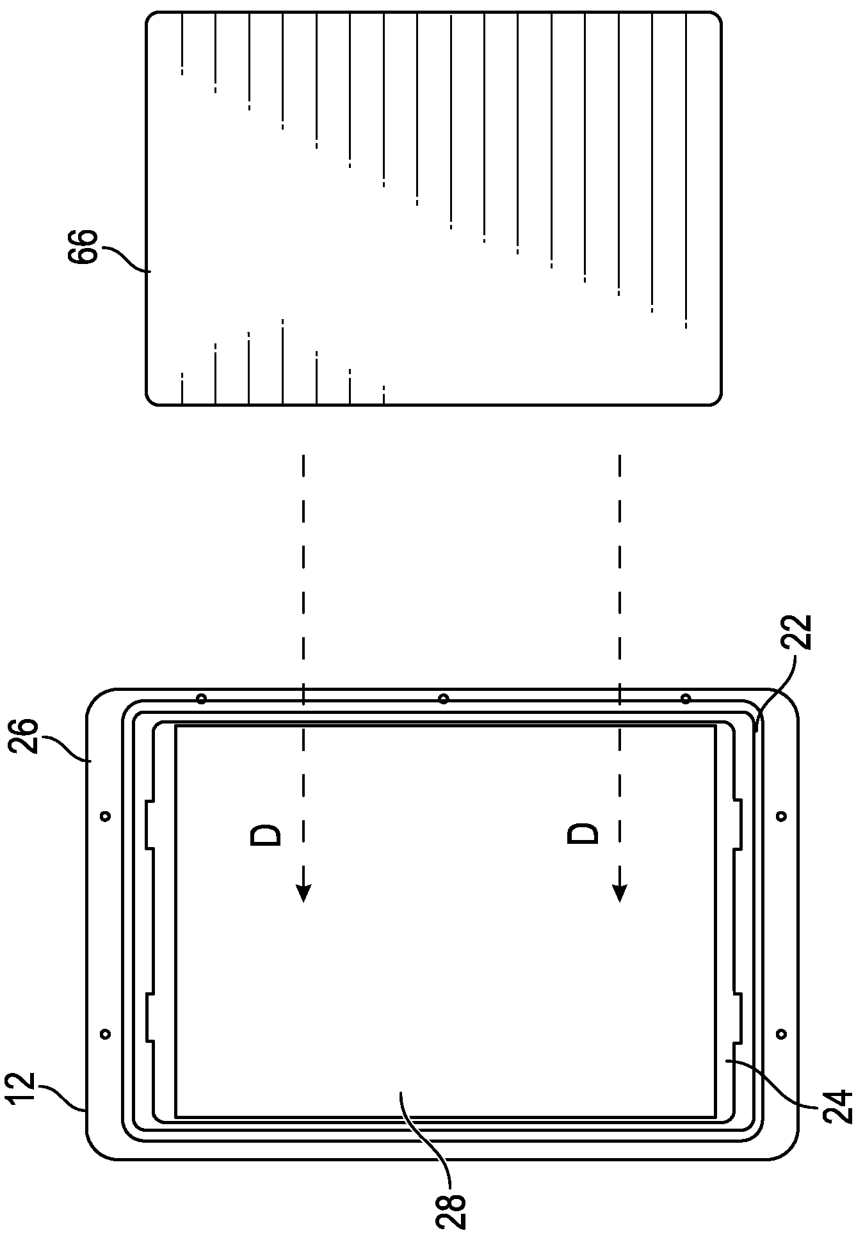
FIG. 6 is a front view of a front chassis assembly of the novel, protective display case of FIG. 1 and an associated memorabilia.

Referring now to FIG. 6, the front chassis assembly 12 is illustrated. The front chassis glazing member 28 is shown installed in the front chassis 26. Also shown are the installed gasket 22 and the spacer 24. In a next assembly step, memorabilia 66 is seated within the cutout 58 of the spacer 24, as schematically depicted by direction arrows D. Once seated within the cutout 58 of the spacer 24, the memorabilia 66 is centered within the front chassis glazing member 28 and secured to prevent excessive movement. In the illustrated embodiment, the memorabilia 66 has the form of a sports trading card. However, it is contemplated that other memorabilia may be used, such as the non-limiting examples of one or more photographs, autographs, identification cards and the like. It is further contemplated that the memorabilia 66 can have other forms, including the non-limiting examples of certificates, documents and the like.

Figure 7:
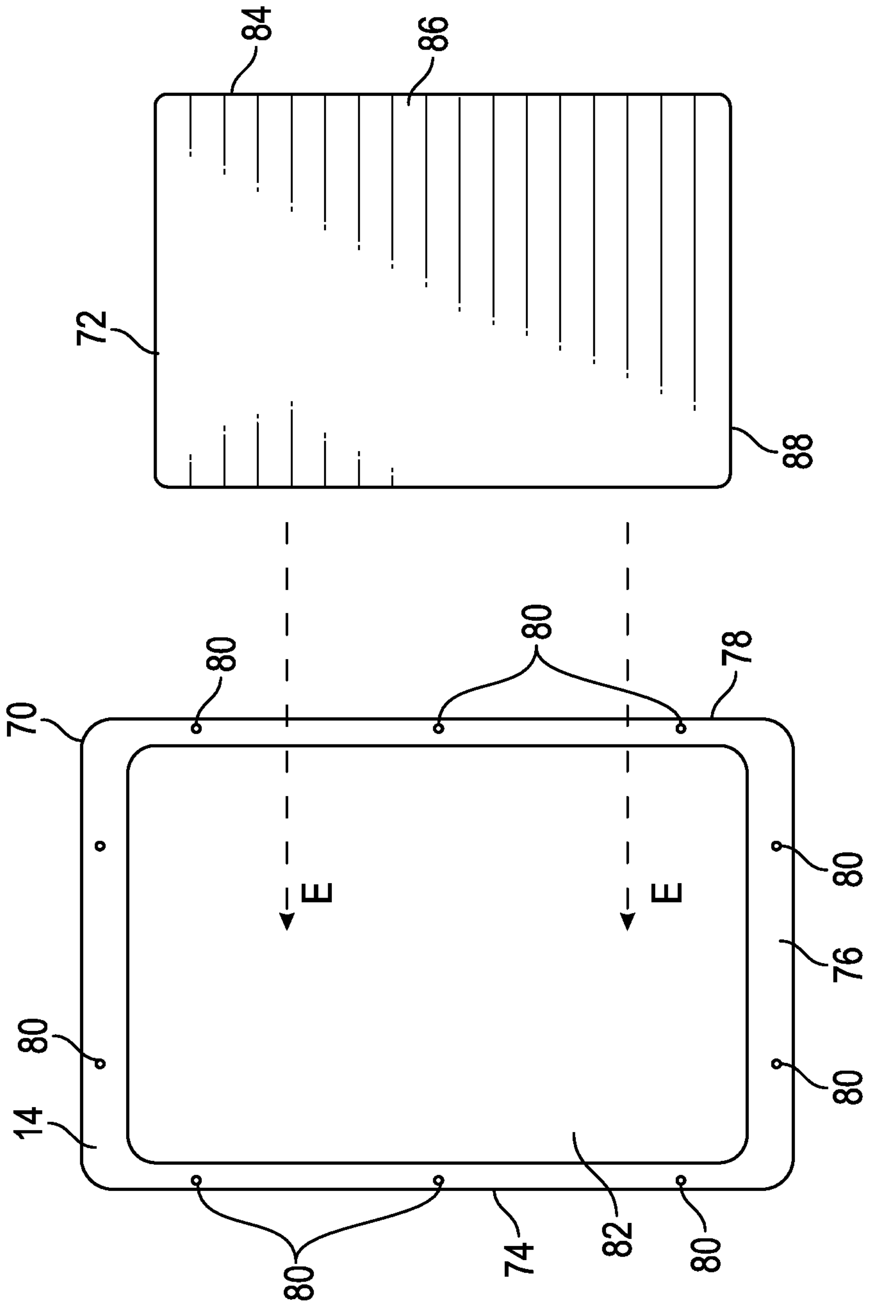
FIG. 7 is a front view of a rear chassis and rear layer glazing member of the novel, protective display case of FIG. 1.

Referring now to FIG. 7, the rear chassis assembly 14 includes a rear chassis 70 and a rear chassis glazing member 72. The rear chassis 70 includes an interior face 74, an opposing exterior face 76 and a perimeter 78. A plurality of spaced-apart apertures 80 extend from the interior face 74 to the exterior face 76. Similarly, a cutout 82 extends from the interior face 74 to the exterior face 76 and is bounded by a shoulder (not shown for purposes of clarity) formed in the interior face 74. The cutout 82 is configured to facilitate visibility of the encased memorabilia 66. In the illustrated embodiment, the cutout 82 and the shoulder are the same as, or similar to, the cutout 38 and the shoulder 40 described above and shown in FIG. 4. In alternate embodiments, the cutout 82 and shoulder can be different than the cutout 38 and the shoulder 40.

In the embodiment illustrated in FIG. 7, the rear chassis 70 is formed from the same, or similar, metallic materials as used to form the front chassis 26 described above and shown in FIG. 4. It is contemplated that in other embodiments, other materials can be used to form the rear chassis 70.

Referring again to FIG. 7, the rear chassis glazing member 72 includes an interior face 84, an exterior face 86 and an outer perimeter 88. The front chassis glazing member 28 has a cross-sectional shape that approximates the cross-sectional shape of the cutout 82. In next assembly step, the rear chassis glazing member 72 is seated within the cutout 82 and against the shoulder, with the outer perimeter 88 abutting the rear chassis 70, as schematically depicted by direction arrows E. The rear chassis glazing member 72 is bonded to the shoulder of the rear chassis 70 in the installed position. The combination of the rear chassis 70 and the rear chassis glazing member 72 forms the rear chassis assembly 14.

Referring again to FIG. 7, the rear chassis glazing member 72 is formed from the same, or similar, materials as used to form the front chassis glazing member 28 described above and shown in FIG. 4. It is contemplated that in other embodiments, other materials can be used to form the rear chassis glazing member 72.

Referring now to FIG. 3 is a next step, the front and rear chassis assemblies 12, 14 and the seated gasket 22, spacer 24 and the memorabilia 66 are aligned in a manner such that the threaded apertures 36 in the front chassis 26 are aligned with the apertures 80 in the rear chassis 80. Once aligned, in a next step, a plurality of fasteners 90 are inserted through the apertures 80 in the rear chassis 70 and are connected to the aligned threaded apertures 26 in the front chassis 26 and threaded apertures 36 in the rear chassis 70. In a next step, the fasteners 90 are tightened slowly and evenly until the gasket 22 is engaged by the interior face 32 of the front chassis 26 and the interior face 74 of the rear chassis 70. In the illustrated embodiment, the fasteners 90 have the form of Torx head machine screws. In alternate embodiments, the fasteners 90 can have other forms sufficient to connect the front and rear chassis assemblies 12, 14 together.

Figure 8:
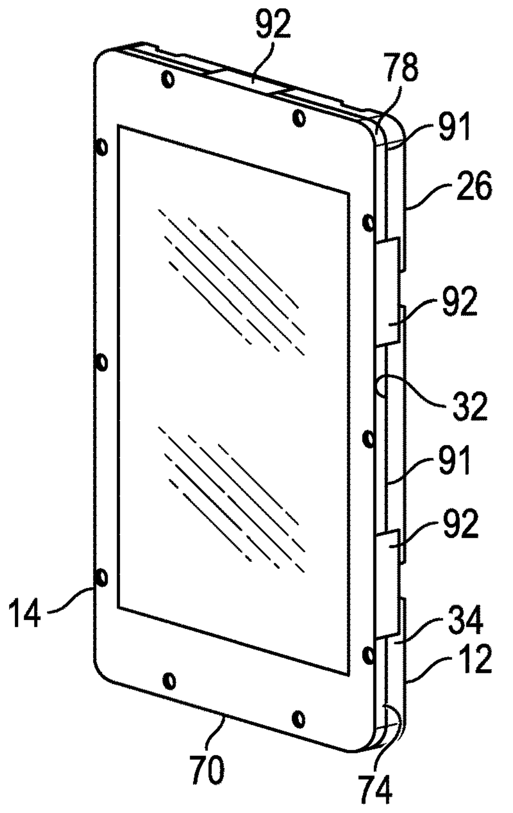
FIG. 8 is a side perspective view of a front chassis assembly of the novel, protective display case of FIG. 1 attached to a rear chassis assembly of the novel, protective display case of FIG. 1.

Referring now to FIG. 8, the assembled front and rear chassis assemblies 12, 14 are shown. An intersection 91 is formed between the interior face 32 of the front chassis 26 and in interior face 74 of the rear chassis 70. In a next step, a plurality of spaced apart tamper evident decals 92 are applied over portions of front and rear chassis perimeters 34, 78 at the intersection 91. The tamper evident decals 92 are configured to show signs when someone or something has tried to open or tamper with a assembled front and rear chassis assemblies 12, 14. In the illustrated embodiment, the tamper evident decals 92 operate by making it impossible to remove or peel up the material forming the decal without damaging the decal in an obvious way. However, in other embodiments, the tamper evident decals 92 can have different forms and can operate in different manners.

Figure 9:
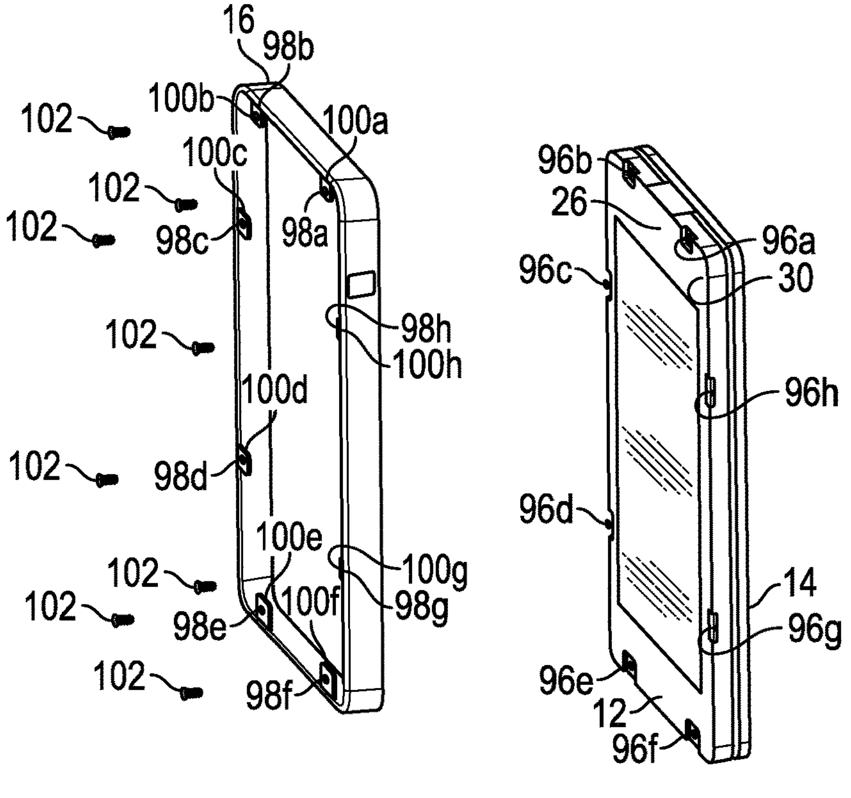
FIG. 9 is a side perspective view of the attached front and rear chassis assemblies of FIGS. 7 and 8 and a bezel of the novel, protective display case of FIG. 1.

Referring now to FIG. 9, the assembled front and rear chassis assemblies 12, 14 are shown with the applied tamper evident decals 92. The exterior face 30 of the front chassis 26 includes a plurality of spaced apart threaded apertures 96*a*-96*h*. In a next assembly step, the bezel 16 is positioned over the front and rear chassis perimeters 34, 78 in a manner such that apertures 98*a*-98*h* contained in tabs 100*a*-100*h* of the bezel 16 align with the threaded apertures 96*a*-96*h* in the exterior face 30 of the front chassis 26.

Referring again to FIG. 9 and once aligned, in a next step, a plurality of fasteners 102 are inserted through the apertures 98*a*-98*h* in the tabs 100*a*-100*h* of the bezel 16 and are connected to the aligned threaded apertures 96*a*-96*h* in the front chassis 26. In a next step, the fasteners 102 are tightened slowly and evenly until the bezel is secured to the assembled front and rear chassis assemblies 12, 14. In the illustrated embodiment, the fasteners 102 have the form of Torx head machine screws. In alternate embodiments, the fasteners 102 can have other forms sufficient to connect the bezel 16 to the front and rear chassis assemblies 12, 14.

Referring again to FIG. 3 in a next step, the front layer of protective glass 18 is bonded to the exterior face 30 of the front chassis 26. In a final assembly step, the rear layer of protective glass 20 is bonded to the exterior face 76 of the rear chassis 70. The front and rear layers of protective glass 18, 20 each have a cross-sectional shape that approximates the cross-sectional shape of the exterior faces 30, 76 of the front and rear chassis 26, 70. In the illustrated embodiment, an adhesive having cold press characteristics is used to bond the front and rear layers of protective glass 18, 20 to the front and rear chassis 26, 70. The use of a cold press adhesive prevents the introduction of heat, thereby avoiding potential damage to the memorabilia 66. However, in other embodiments, other suitable adhesives can be used.

In the embodiment illustrated in FIG. 3, the front and rear layers of protective glass 18, 20 are formed from alkali-aluminosilicate based and/or crystalline silicas based materials. One non-limiting example of an alkali-aluminosilicate based material is Gorilla Glass®. However, in other embodiments, other suitable forms of protective glass can be used.

Figure 10:
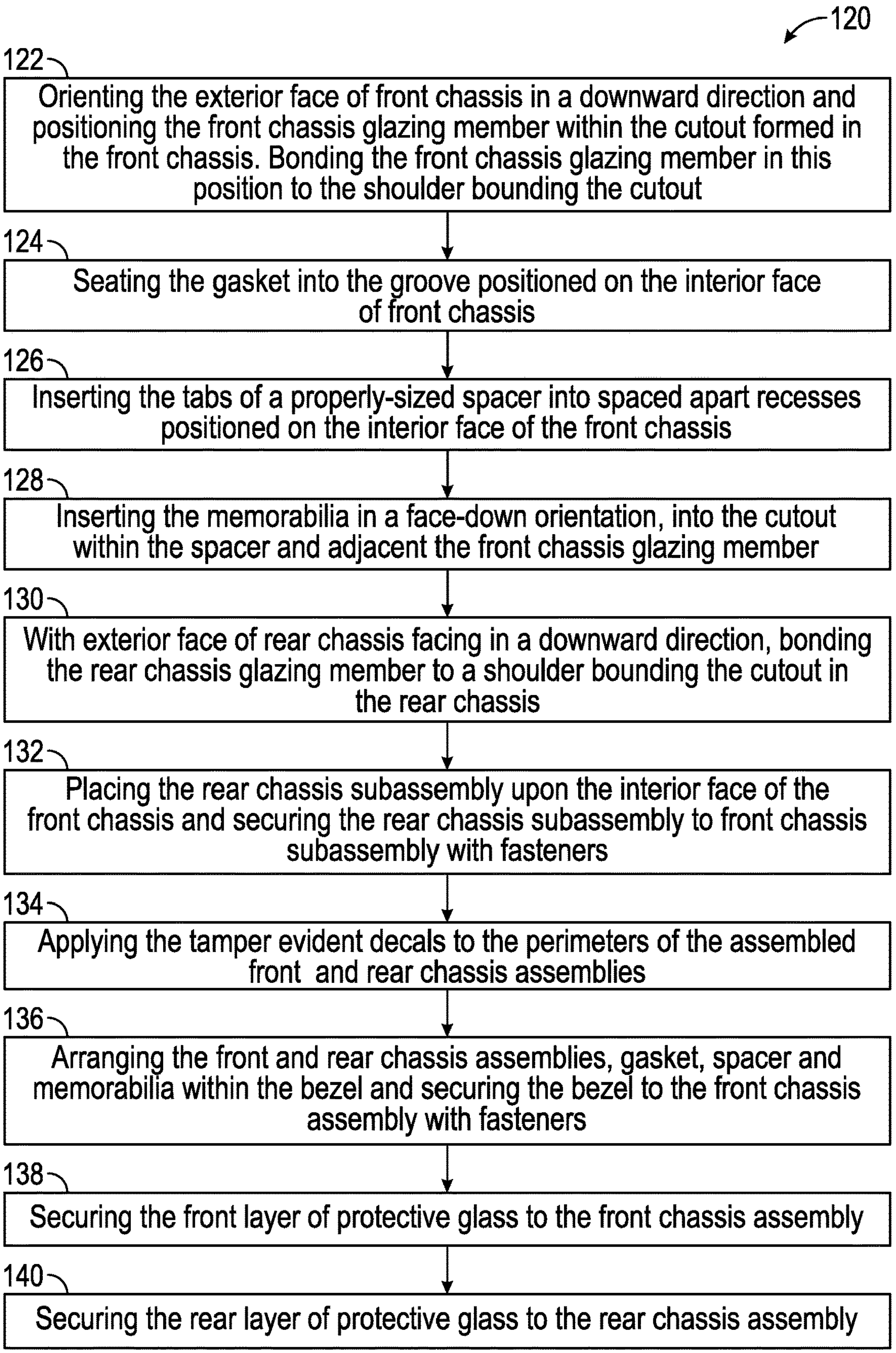
FIG. 10 is a flow chart of a method of assembling the novel, protective display case of FIG. 1.

Referring now to FIG. 10, a summary of the method of assembling the display case 10 is presented at 120. In an initial assembly step 122, the exterior face 30 of front chassis 26 is oriented in a downward direction and the front chassis glazing member 28 is positioned within the cutout 38 formed in the front chassis 26. The front chassis glazing member 28 is bonded in this position to the shoulder 40 bounding the cutout 38. In a second step 124, the gasket 22 is seated into the groove 54 positioned on the interior face 32 of front chassis 26. Next, in third step 126 the tabs 60*a*-60*d* of a properly sized spacer 24 are inserted into spaced apart recesses 56*a*-56*d* positioned on interior face 32 of the front chassis 26.

Referring again to FIG. 10 in a fourth step 128, the memorabilia 66 is inserted, in a face-down orientation, into the cutout 38 within the spacer 24 and adjacent the front chassis glazing member 28. In a fifth step 130 and with interior face 76 of rear chassis 70 facing in a downward direction, the rear chassis glazing member 72 is bonded to a shoulder bounding the cutout 82 in the rear chassis 70. In sixth step 132 the rear chassis subassembly 14 placed upon the interior face 32 of front chassis 26 and the rear chassis subassembly 14 is secured to front chassis subassembly 12 with fasteners 90.

Referring again to FIG. 10 in a seventh step 134, the tamper evident decals 92 are applied to the perimeters 34, 78 of the assembled front and rear chassis assemblies 12, 14. Next, in an eighth step 136, the front and rear chassis assemblies 12, 14, gasket 22, spacer 24, memorabilia 66 and fasteners 90 are arranged within the bezel 16 and the bezel 16 is secured to the front chassis assembly 12 with fasteners 102. In ninth step 138, the front layer of protective glass 18 is secured to the front chassis assembly 12. In a final and tenth step 140, the rear layer of protective glass 20 is secured to the rear chassis assembly 14.

Advantageously, the display case 10 meets accepted institutional archival standards for the storage of archival documents. The display case 10 is configured to safely store valuable memorabilia over the long term. The display case 10 is assembled from materials that will not harm the encased memorabilia and is suitable for long-term archival storage and display. Further and also advantageously, the display case 10 offers a degree of protection for the encased memorabilia from environmental hazards such as moisture, electromagnetic spectrum hazards including ultraviolet light (UV), and physical abrasion, lacerations and the like. The display case 10 also includes several techniques used to deter counterfeiting, such as tamper-evident/proof seals, serial numbers, QR codes, and other techniques.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A protective display case configured to encase memorabilia, the protective display case comprising:
- a front chassis assembly having a front chassis and a front chassis glazing member;
- a gasket seated in a groove formed in a front face of the front chassis;
- a spacer seated over the front chassis glazing member;
- memorabilia positioned within a cutout formed in the spacer;
- a rear chassis assembly having a rear chassis and a rear chassis glazing member, the rear chassis assembly attached to the front chassis assembly with the gasket, spacer and memorabilia positioned therebetween;
- a bezel configured to cover perimeters of the front and rear chassis assemblies, gasket, spacer and memorabilia;
- a front layer of protective glass secured to the front chassis assembly; and
- a rear layer of protective glass secured to the rear chassis assembly.

2. The protective display case of claim 1, wherein the front chassis glazing member is positioned in a cutout defined by a shoulder of the front chassis.

3. The protective display case of claim 1, wherein the front chassis glazing member is formed from acrylic-based material.

4. The protective display case of claim 1, wherein the spacer includes a plurality of tabs configured for insertion into recesses formed in the front chassis.

5. The protective display case of claim 1, wherein a size and shape of the cutout of the spacer approximates the size and shape of the memorabilia, such that in an installed position the memorabilia is restrained from movement within the spacer.

6. The protective display case of claim 1, wherein the rear chassis glazing member is positioned in a cutout formed within the rear chassis.

7. The protective display case of claim 1, wherein the rear chassis glazing member is formed from acrylic-based material.

8. The protective display case of claim 1, wherein the front and rear chassis assemblies are attached to each other with machine screws.

9. The protective display case of claim 1, wherein the gasket extends from the front chassis assembly a distance sufficient to engage the rear chassis assembly, thereby forming a seal therebetween.

10. The protective display case of claim 1, wherein each of the front and rear layers of protective glass are formed from acrylic-based material.

11. A method of assembling a protective display case, the method comprising steps of:
- forming a front chassis assembly having a front chassis and a front chassis glazing member;
- seating a gasket in a groove formed in a front face of the front chassis;
- seating a spacer over the front chassis glazing member;
- seating memorabilia into a cutout formed in the spacer;
- forming a rear chassis assembly having a rear chassis and a rear chassis glazing member;

attaching the front and rear chassis assemblies together with the gasket, spacer and memorabilia positioned therebetween;

arranging the front and rear chassis assemblies, gasket, spacer and memorabilia within a bezel and securing the bezel to the front chassis assembly;

securing a front layer of protective glass to the front chassis assembly; and securing a rear layer of protective glass to the rear chassis assembly.

12. The method of claim 11, including a step of positioning the front chassis glazing member in a cutout defined by a shoulder of the front chassis.

13. The method of claim 11, including a step of forming the front chassis glazing member from acrylic-based material.

14. The method of claim 11, including a step of inserting tabs extending from the spacer into recesses formed in the front chassis.

15. The method of claim 11, including a step of size and shape of the cutout of the spacer to approximate the size and shape of the memorabilia, such that in an installed position the memorabilia is restrained from movement within the spacer.

16. The method of claim 11, including a step of positioning the rear chassis glazing member in a cutout formed within the rear chassis.

17. The method of claim 11, including a step of forming the rear chassis glazing member from acrylic-based material.

18. The method of claim 11, including a step of attaching the front and rear chassis assemblies together with machine screws.

19. The method of claim 11, wherein the gasket extends from the front chassis assembly a distance sufficient to engage the rear chassis assembly, thereby forming a seal therebetween.

20. The method of claim 11, including a step of forming the front and rear layers of protective glass from acrylic-based material.

* * * * *